United States Patent Office 3,255,226
Patented June 7, 1966

3,255,226
PROCESS FOR THE PREPARATION OF ARYL-
METHANE ISOCYANATES AND THE PURI-
FICATION OF ALKYL AND HALOALKYL
ISOCYANATES
Herbert Felix McShane, Jr., Wilmington, Del., assignor to
E. I. du Pont de Nemours and Company, Wilmington,
Del., a corporation of Delaware
No Drawing. Filed Dec. 21, 1962, Ser. No. 246,325
18 Claims. (Cl. 260—453)

This invention relates generally to chemical reactions between haloalkylaryl isocyanates and reactive aromatic compounds in the presence of a Friedel-Crafts catalyst and more particularly to a new process for the preparation of essentially monomeric arylalkyl isocyanates and to a new process for removing haloalkylaryl isocyanate contaminants from alkylaryl isocyanates.

In one aspect of reacting haloalkylaryl isocyanates with reactive aromatic compounds, the problem of preparing certain isocyanates is relevant. Aromatic mono-, di- and polyisocyanates, generically termed as "isocyanates," are versatile and highly reactive organic intermediates, and are generally prepared by phosgenation of the corresponding amine. This is an excellent preparative route, but its use is limited by the availability of the required amine starting materials. This limitation is also present when it comes to preparing arylmethane isocyanates, but with the difference that many arylmethane isocyanates are difficult to prepare by the customary route of amine phosgenation.

In another aspect of reacting haloalkylaryl isocyanates with reactive aromatic compounds, the problem of purifying alkylaryl isocyanates which contain haloalkylaryl isocyanate contaminants is relevant. Haloalkylaryl isocyanates are exceptionally reactive chemical intermediates and their presence, even in small amounts, may interfere in reactions employing isocyanates exhibiting a more usual degree of reactivity such as tolylene diisocyanate and dichlorotolylene diisocyanate. The haloalkylaryl isocyanates are also capable of undergoing reactions involving the α-halogen which are not possible with other alkylated aromatic isocyanates. For example, the α-halogen in haloalkylaryl isocyanates reacts readily with tertiary amines to produce quaternary ammonium salts. This reaction can destroy tertiary amine catalysts which are often employed in isocyanate reactions. Other disadvantages associated with the haloalkylaryl isocyanates include the rapid formation of color in alkylated aromatic isocyanates containing trace amounts of haloalkylaryl compounds and color formation in finished products produced from such contaminated isocyanates.

The presence of haloalkylaryl isocyanate contaminants is a particularly serious problem with ring halogenated alkylaryl isocyanates which have been made by reacting chlorine, bromine monochloride, or bromine with the corresponding alkylaryl isocyanates with a catalyst such as ferric chloride by processes such as those disclosed in U.S. Patents 2,915,545 and 2,945,875. While most of the chlorine or bromine added to the alkylaryl isocyanate will ring substitute through an ionic mechanism, more or less chlorine or bromine will be found to have added to the alkyl group of the isocyanate via a free radical mechanism. The quantity of haloalkylaryl isocyanate found in such ring halogenated isocyanates is often sufficient to prevent further use of the ring halogenated aromatic isocyanate. Separation of the haloalkylaryl isocyanate from the desired alkylaryl isocyanate is usually difficult by means of distillation because of the closeness of boiling points and the difficulty of fractionally distilling these relatively high boiling materials. Separation by recrystallization often can be resorted to for removing the haloalkylaryl isocyanates from the desired alkylaryl isocyanates, but this is an expensive procedure and one which is often wasteful of the desired isocyanate. Particular difficulties have been encountered in the preparation of 3,5-dichloro-2,4-tolylene diisocyanate by chlorination of tolylene diisocyanate in the presence of ferric chloride. During this chlorination, ring halogenated tolylene diisocyanates containing one and three chlorogroups are produced along with the dichlorotolylene diisocyanate. In addition, minor amounts of 5,α-dichloro-; 3,5,α-trichloro-; and 3,4,α-tetrachloro-2,4-tolylene diisocyanates are produced. Distillation of this relatively complex mixture, employing a limited amount of fractionation, permits separation of 3,5-dichloro-2,4-tolylene diisocyanate contaminated with 5,α-dichloro-2,4-tolylene diisocyanate. Repeated fractional distillations of this impure material reduce the concentration of the α-chlorinated alkyl diisocyanate, but the last traces of this impurity are exceedingly difficult to eliminate and may still be harmful to the utility of the desired isocyanate.

While the contamination from haloalkylaryl isocyanates is generally more serious in the case of ring halogenated alkylated aromatic isocyanates, it can also be a problem in the manufacture of tolylene diisocyanate and 4,4'-diisocyanatodiphenylmethane by phosgenation of the corresponding diamines. The formation of haloalkylaryl isocyanate contaminants can come about in this case as a result of free chlorine being present in the phosgene used in the phosgenation reaction. Since phosgene is normally prepared by reacting chlorine gas with carbon monoxide in the presence of an activated charcoal catalyst, it is not surprising that phosgene may on occasion contain a small quantity of chlorine. If a phosgenation is run using chlorine contaminated phosgene, much of the chlorine that reacts with the isocyanate present will substitute in the ring, but a small quantity will generally attack the alkyl group in the isocyanate. Small amounts of ring halogenated isocyanate impurities in isocyanates such as tolylene diisocyanate generally do not interfere in the use of the material, for ring halogen is relatively inert and will not react with a tertiary amine catalyst for example. However, the presence of even a relatively small quantity of α-chlorotolylene diisocyanate in tolylene diisocyanate, may interfere with its use in the preparation of materials such as urethane foams and elastomers.

It is therefore an object of the present invention to perform various reactions between haloalkylaryl isocyanates and reactive aromatic compounds in the presence of a Friedel-Crafts catalyst to obtain novel, highly useful, and valuable results. A particular object of the present invention is to provide an improved process for the preparation of essentially monomeric arylalkyl isocyanates and more specifically a process which does not include phosgenation of amine starting materials. Another particular object of the present invention is to provide a new and improved process for removing haloalkylaryl isocyanate contaminants from alkylaryl isocyanates. Other objects will appear hereinafter.

These and other objects are accomplished by the process which generally involves condensing an aromatic compound having at least one haloalkyl substituent, in the presence of a Friedel-Crafts catalyst and at a temperature of about 50° C. to about 250° C., with a sufficient amount of another aromatic compound which is reactive with the haloalkyl substituted aromatic compound to replace substantially all of the α-halogen thereof in a Friedel-Crafts alkylation type reaction, at least one of said compounds containing at least one —NCO group, and obtaining as a result thereof an arylmethane isocyanate.

Halomethyl substituted aromatic compounds are preferred. It should be understood that other alkyl substituents, such as ethyl and propyl, containing α-halogen can be present in place of the halomethyl radical in the process of the present invention and that said other alkyl substituents can, in turn, be substituted with radicals which do not interfere with the alkylation reaction.

The halomethyl substituted aromatic compound can be represented by the formula $R[CH_{(3-n)}X_n]_m$, wherein X is selected from the group consisting of Cl and Br; $m$ and $n$ are independently selected from the group consisting of 1 and 2; and R is selected from the group consisting of unsubstituted, except as defined by the above formula, and substituted phenyl, phenylene, naphthyl and naphthylene. The reactive aromatic compound can be represented by the formula R'H, wherein R' is selected from the group consisting of unsubstituted and substituted naphthyl, anthryl, 4-isocyanatophenyl, 4-alkoxyphenyl and 4-aryloxyphenyl. The substitutents for R and R' in the above formulas are independently selected from the class consisting of Cl, Br, $C_1-C_4$ alkyl and —NCO with the provisos that the sum of the —NCO groups in R and R' must be at least one and that each —NCO group is separated from another —NCO group by at least one ring position. At least $mn$ moles of reactive aromatic compound are preferably employed in the reaction.

The product of the condensation reaction as generally set forth above, between the halomethyl substituted aromatic compound and the reactive aromatic compound, is an arylmethane isocyanate which is thus formed without phosgenation of a corresponding amine. This same general condensation reaction serves to facilitate removal of haloalkylaryl isocyanate contaminants from alkylaryl isocyanates since the arylmethane isocyanate formed has a sufficiently higher boiling temperature than the non-α-halogen containing alkylaryl isocyanate so that the latter, the desired isocyanate, can be purified by distillation. The major difference between forming arylmethane isocyanate for utility as a composition and the same for purification purposes is in the quantity of halomethylaryl isocyanate reactant present in the reaction system; in the novel purification process only a small proportion of this reactant, usually less than 20% by weight, is present in the contaminated alkylaryl isocyanate and consequently, a corresponding small amount of reactive aromatic compound is employed. Naturally, much larger amounts of each reactant will be present when the arylalkyl isocyanate is desired for utility.

Accordingly, within the scope of the present invention is a process for preparing arylmethane isocyanates, which comprises contacting and reacting, in the presence of a Friedel-Crafts catalyst and at a temperature within the range from about 50° C. to about 250° C., an α-halogenated aromatic compound having the formula

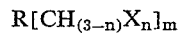

with at least $mn$ moles of a reactive aromatic compound having the formula R'H, said formulas being as hereinbefore defined, and obtaining as a result thereof essentially monomeric arylmethane isocyanate.

Another process within the scope of the present invention is the method for purifying a mixture of alkylaryl isocyanate and haloalkylaryl isocyanate, the latter being the contaminant, in which the halo-substituent is selected from the group consisting of Cl and Br, which process comprises contacting said mixture, in the presence of a Friedel-Crafts catalyst and at a temperature within the range from about 50° C. to about 250° C., with a sufficient amount of a reactive aromatic compound capable of forming with substantially all of said haloalkylaryl isocyanate a condensation product having a substantially higher boiling temperature than that of said alkylaryl isocyanate, whereby said haloalkyl isocyanate and said reactive aromatic compound condense to form said product, and separating the alkylaryl isocyanate by distillation.

In the foregoing two processes just defined, the preferred embodiments of different aspects of the present invention are described. Hence, the preferred isocyanates to be prepared for utility are arylmethane isocyanates, whereas for purification purposes the isocyanates obtained are preferably more broadly described as arylalkyl isocyanates, because of the possibility of haloalkyl substituents other than halomethyl being present in the contaminating isocyanate. As previously stated, the scope of the general condensation reaction of the present invention includes the presence of haloalkyl radicals other than halomethyl.

Details of the several processes which involve the general condensation reaction hereinbefore described will be discussed separately according to the particular process.

PREPARATION OF ARYLMETHANE ISOCYANATES

With reference to the preferred process for preparing arylmethane isocyanates, the reaction of α-halogenated aromatic compounds represented by the formula

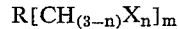

with reactive aromatic compounds represented by the formula R'H can be used to prepare arylmethane isocyanates which can be categorized into four general types.

The simplest arylmethane isocyanates which can be produced are diarylmethane derivatives in which two aryl groups are connected through a methylene group. These compounds are produced from halomethylaryl compounds having the formula $RCH_2Cl$ and are a reactive aromatic compound R'H. The formula for the product of this reaction is $RCH_2R'$.

When the halomethylaryl compound has two halomethyl substituents, as represented by the formula $R(CH_2Cl)_2$, and is reacted with two moles of reactive aromatic compound R'H, a product consisting of three aryl groups connected to one another by methylene groups is formed. This type product may be represented by the formula R'—$CH_2$R—$CH_2$—R'. An example would be the product formed by reacting p-xylylene dichloride with two moles of 1-naphthylisocyanate.

Reaction of halomethylaryl compound having the formula $RCHCl_2$ with two moles of reactive aromatic compound, R'H, produces a third type arylmethane isocyanate having the formula $RCH(R')_2$. These compounds are triphenylmethane derivatives. An example is the compound which can be produced by reacting benzal chloride with two moles of phenyl isocyanate.

The final type product which may be made by the process of the present invention is produced by reacting a halomethylaryl compound of the formula $R(CHCl_2)_2$ with four moles of reactive aromatic compound, R'H, to produce a compound having the formula $R(CHR'_2)_2$.

The halomethylaryl compounds which can be employed to prepare arylmethane isocyanates can be represented by the general formula

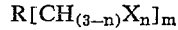

where X=Cl or Br, $m=1$ or 2, $n=1$ or 2, and R=may be phenyl, phenylene, naphthyl and naphthylene. In addition, R can be substituted with Cl, Br, $C_1-C_4$ alkyl or isocyanato groups. It is not necessary that the halomethylaryl compound contain an isocyanato group if it is condensed with are active aromatic compound containing at least one isocyanato group; however, the halomethylaryl compound must contain an isocyanato group if it is recated with a reactive aromatic compound which does not contain an isocyanato group. Halomethylaryl compounds containing two or more isocyanato groups occupying ortho or peri positions with respect to each other are not included among the halomethylaryl compounds which may be employed in the instant process.

Representative examples of the halomethylaryl compounds which may be employed to prepare useful arylmethane isocyanates include the following:

Benzyl chloride
Benzal chloride 4-chlorobenzyl chloride
4-bromobenzyl chloride
α-Bromoxylene
4-xylylene dichloride
1-chloromethylnaphthalene
1,5-dichloromethylnaphthalene
α-Chloro-4-tolyl isocyanate
α-Chloro-2,4-tolylene-diisocyanate
5,α-dichloro-2,4-tolylene-diisocyanate
5-chloromethyl-1-naphthylisocyanate
5-chloro-1-chloromethylnaphthalene
α-Dichloro-2,4-tolylene diisocyanate
3,5,α-trichloro-2,4-tolylene-diisocyanate
3,5,6,α-tetrachloro-2,4-tolylene-diisocyanate
α,α,α',α'-Tetrachloro-4-xylene The reactive aromatic compounds which may be used to prepare arylmethane isocyanates may be represented by the general formula R'H in which R'=naphthyl, anthryl, 4-isocyanato phenyl, 4-alkoxyphenyl or 4-aryloxyphenyl. The reactive aromatic compound may be substituted with Cl, Br, $C_{1-4}$ alkyl or isocyanato groups. The reactive aromatic compound must contain at least one isocyanato group. As in the case of the halomethylaryl compound free of isocyanato groups; however, the reactive compound may be free of isocyanato groups if it is reacted with a halomethylaryl compound containing an isocyanato group. As in the case of the halomethylaryl compounds, reactive aromatic compounds containing two or more isocyanato groups ortho or peri to one another are not included in the compounds which may be employed in this process. The reactive aromatic compounds included undergo the Friedel-Crafts condensation very readily, and this minimizes the possibility of the halomethylaryl compound condensing with itself.

The aromatic compounds commonly alkylated by the Friedel-Crafts reaction include benzene, alkylated benzenes, phenols, phenol ethers and polynuclear hydrocarbons. In general, aromatic compounds containing strong ortho-para directing groups, such as alkyl, hydroxyl, alkoxy and aryloxy, and polynuclear aromatic hydrocarbons tend to undergo the Friedel-Crafts reaction more readily than benzene or benzene derivatives containing meta directing substituents such as the nitro group. Of the more reactive compounds, phenol ethers, polynuclear aromatic hydrocarbons and phenyl isocyanates having an unsubstituted 4-position are preferred in the present process because they are more reactive than alkylated benzenes and are surprisingly not reactive toward the isocyanato group as are the phenols.

Representative examples of reactive aromatic compounds which may be condensed with halomethylaryl isocyanates to form arylmethane isocyanates are as follows:

Naphthalene
Anthracene
1-methylnaphthalene
Anisole
Phenetole
Diphenylether
4-methyldiphenylether
1-naphthylisocyanate
Naphthalene-1,5-diisocyanate
1-bromonaphthalene
2-tolyl isocyanate
2,4-tolylene-diisocyanate
2,6-tolylene-diisocyanate
Phenyl isocyanate
o-Chlorophenyl isocyanate
3-chloro-2,6-tolylene-diisocyanate In general, the halomethylaryl compounds and the reactive aromatic compounds required as starting materials in the instant process are well known; however, ring halogenated aromatic isocyanates and halomethylaryl isocyanates may be exceptions. Ring halogenation of aromatic isocyanates may be carried out according to the general directions presented in U.S. Patents 2,915,545 and 2,945,875. Halomethylaryl isocyanates may be prepared by the procedures given in German Patents 947,470 and 1,002,327. Ring-halogenated aromatic isocyanates which also bear a halomethyl group may be prepared by ring halogenation followed by halogenation of the methyl group.

The tolylene diisocyanates and their ring halogenated and/or α-halogen derivatives form a particularly useful class of reactants in the process of preparing arylmethane isocyanates. A mixture of about 80 parts by weight of 2,4-tolylene diisocyanate and 20 parts by weight of 2,6-tolylene diisocyanate is especially preferred either as a reactant in the process of the present invention or as a starting material for the preparation of halogenated tolylene diisocyanates and/or α-halogen containing tolylene diisocyanates. Ring chlorination of the mixture of about 80 parts 2,4-tolylene diisocyanate and 20 parts of 2,6-tolylene diisocyanate, both by weight, may be carried out by introducing chlorine gas about as rapidly as it is consumed into the well-agitated tolylene diisocyanate isomer mixture containing about 1–3% by weight of ferric chloride or iodine. To prevent extensive losses of unreacted chlorine, a "Dry Ice" reflux condenser may be attached to the reactor so that evolved hydrogen chloride gas escapes, while most of the chlorine is condensed and returned to the reaction. With this equipment arrangement, about 1.2 moles of chlorine are supplied for every chlorine atom to be substituted. In a similar fashion, bromine may be introduced using bromine or bromine monochloride (BrCl) in place of chlorine. About 1.05 moles of bromine or BrCl are supplied for every bromine atom to be ring substituted. Sequential introduction of bromine and chlorine atoms can be used to produce halogenated toluene diisocyanates containing both chlorine and bromine substituents. The halogenated tolylene diisocyanate isomer mixture may be separated from high-boiling by-products and tars by vacuum distillation at pressures below about 5–10 mm. Hg.

α-Halogen derivatives of the 80:20 mixtures of tolylene diisocyanate isomers and corresponding ring-halogenated derivatives may be made by treating the tolylene diisocyanate mixture or ring-halogenated derivative with about 1 mole of chlorine per mole of diisocyanate at temperatures ranging from about 100–150° C. under the influence of ultra-violet light and/or a free radical generator such as azobisisobutyronitrile. The α-halogenated tolylene diisocyanates may be purified by vacuum distillation at low pressures.

In carrying out the process of the present invention of preparing arylmethane isocyanates, at least one mole of reactive aromatic compound should be employed for every α-halogen contained in a mole of the halomethylaryl compound. In other words, with halomethylaryl compounds having only one α-halogen, at least one mole of reactive aromatic compound should be used for each mole of halomethylaryl compound. With compounds such as p-xylylene dichloride or benzal chloride which contain two α-halogens per mole, at least two moles of reactive aromatic compound should be employed per mole of halomethylaryl compound. The yield of arylmethane isocyanate generally will be higher if the reactive aromatic compound is employed in excess. This is true because halomethylaryl compounds with open positions on their ring are often capable of condensing with themselves and the presence of a large excess of reactive aromatic compound reduces the tendency of this undesirable side-reaction to occur. As previously indicated, the reactive aromatic compounds included within the scope of the present invention have been selected because they are capable of undergoing the Friedel-Crafts reaction far more easily than most aromatic compounds. Excess reactive aromatic compound also reduces the probability of two molecules of the halomethylaryl compound reacting with the same molecule of reactive aromatic compound. By employing about 3–5 moles of reactive aromatic compound per equivalent of α-halogen in a mole of the halomethylaryl compound, the self-condensation of the halomethylaryl compound and the dialkylation of the reactive aromatic compound can be suppressed sufficiently so that a good yield of the desired monomeric rather than polymeric arylmethane isocyanate is obtained. Even greater quantities of reactive aromatic compound may be employed if so desired, but the advantages gained through a slight improvement in yield or quality are usually offset by the need to recover large quantities of the aromatic compound.

Any conventional Friedel-Crafts type catalyst may be used to bring about the condensation reaction of the halomethylaryl compound with the reactive aromatic compound. Representative examples of such catalysts include aluminum chloride, stannic chloride, zinc chloride and ferric chloride. Of these catalysts, ferric chloride is preferred because it is soluble in the reaction medium and sufficiently active to bring about condensation of the halomethylaryl compound and the reactive aromatic compound under reasonable conditions. Ferric chloride does not have to be removed or deactivated in any way prior to the separation of the desired arylmethane isocyanate from high-boilers and tars by distillation. Although as little as 0.1% catalyst is capable of bringing about the condensation, such small quantities of catalyst may prolong the time required for completing the condensation. Prolonging the reaction time may increase the formation of by-products and as a result, it is generally preferred to use about 0.5 to 2 parts of the Friedel-Crafts catalyst per 100 parts of crude reaction mass. With the preferred Friedel-Crafts catalyst, ferric chloride, good results are obtained when the catalyst is employed at a level of about 1 part per 100 parts of reaction mass. Greater than 2 parts of catalyst per 100 parts of reaction mass can be used, but excessive amounts of catalyst may make the reaction difficult to control and will generally result in distillation losses of the desired product by increasing the size of the still heel.

The process of the present invention for preparing arylmethane isocyanates may be carried out at temperatures ranging from about 50 to 250° C. Selection of the temperature to use depends upon such factors as the quantity of catalyst, the reactivity of the halomethylaryl compound and the reactive armomatic compound, and the boiling and freezing points of the reaction system. When ferric chloride is employed as the catalyst, it is preferably added to the reaction system at the lowest temperature at which the system is liquid. The temperature of the reaction mass is then raised at an even rate until the evolution of HCl, which accompanies the condensation, reaches the highest rate that is easily handled by the equipment being employed. As the reaction proceeds or nears completion, the temperature of the reaction mass can be increased to hasten completion of the reaction. When ferric chloride is employed at a level of about 1 part per 100 parts by weight of reaction mass, the condensation reaction will usually start at temperatures in the range of 50–120° C. Near the end of the reaction, temperatures in the range of about 180–210° C. may be employed to complete the reaction in a reasonable length of time. Temperatures above 250° C. are generally not employed because the rate of thermal decomposition of the desired isocyanate may become excessive at such high temperatures. Naturally, the temperature of the condensation reaction cannot exceed the boiling point of the system without adding the complication of pressurizing the system.

The time required to complete the condensation reaction involved in this process depends on several factors including the type catalyst employed, the temperature of reaction and the nature of the starting materials. When ferric chloride is employed in the recommended quantities, the condensation reaction can usually be completed in about 2–6 hours if the reaction is pushed as it nears completion by raising the temperature to about 200° C. At lower temperatures, the time required to complete the reaction increases in the manner which would be expected. If large quantities of catalyst are employed at temperatures above about 150° C., the condensation reaction may be completed in less than an hour; however, the vigorous evolution of HCl which is encountered under these conditions may be difficult to handle.

The condensation of the present invention may be carried out in the presence of solvents if desired. However, solvents will generally lower the rate of the reaction and complicate the isolation of the desired arylmethane isocyanate. Solvents may be useful if the starting materials or the product arylmethane isocyanate are high melting solids. If a solvent is employed, it must be chosen so that it does not interfere with the condensation reaction and is not attacked by the Friedel-Crafts catalyst or the halomethylaryl compound. Solvents such as o-dichlorobenzene, trichlorobenzene and nitrobenzene may generally be employed.

As previously mentioned, the condensation of the halomethylaryl compound with the reactive aromatic compound is accompanied by the production of hydrogen chloride. If the condensation is carried out at temperatures below 100–150° C. a significant quantity of this hydrogen chloride may combine with isocyanato groups to produce carbamyl chlorides. The carbamyl chloride may turn react, via a Friedel-Crafts acid chloride condensation, with the desired alkylated aromatic isocyanate or the reactive aromatic compound. This undesirable side-recation can be minimized by sparing the condensation mass with a dry inert gas during the reaction. At higher temperatures, sparging of the condensation mass with a slow stream of an inert gas is still recommended so that hydrogen chloride will be removed about as rapidly as it is evolved.

The condensation process for preparing arylmethane isocyanates may be carried out in a variety of conventional laboratory and plant scale equipment. Any vessel which may be heated to the desired temperatures and which can be agitated either mechanically or even by means of inert gas sparging can be employed. The reaction may be conducted continuously using equipment such as a series of agitated vessels, packed towers or sieve plate towers having relatively high hold up times. If batch distillation equipment is to be employed in separating the product from high boiling materials, the condensation reaction may be carried out in the still pot prior to distillation. While the ingredients required can be charged in any order, it is generally preferred to add the halomethylaryl compound and reactive aromatic compound and to heat them to a sufficient temperature to produce a melt prior to adding the Friedel-Crafts catalyst. If there is danger that the reaction may proceed with too much vigor when the catalyst is added to the mixture of halomethylaryl compound and reactive aromatic compound, one may either (1) add the catalyst in small portions or (2) charge the reactive aromatic compound and ferric chloride to the reaction vessel and add the halomethylaryl compound gradually to this mixture. The latter procedure of adding the halomethylaryl compound gradually to a mixture of the reactive aromatic compound and Friedel-Crafts catalyst has the advantage of minimizing self-condensation of the halomethylaryl compound and dialkylation of the reactive aromatic compound because the reactive aromatic compound will be present in great excess during the early stages of addition. As previously mentioned, it is usually desirable to add the Friedel-Crafts catalyst to the reaction mass at the lowest possible temperature, because the condensation reaction generates considerable heat and simultaneously evolves hydrogen chloride. If the reaction is allowed to "run away," evolution of HCl may become so vigorous that a portion of the reaction mass will be blown from the reaction vessel.

When the condensation reaction of the halomethylaryl compound and the reactive aromatic compound is essentially complete as evidenced by the cessation of hydrogen chloride evolution, any excess reactive aromatic compound and the arylmethane isocyanate may be recovered by distillation at reduced pressure. Distillation may be performed in conventional batch or continuous vacuum distillation equipment. Although a limited degree of fractionation may be desirable on occasion, simple distillation is usually adequate to separate excess reactive aromatic compound from the arylmethane isocyanate. This is true because the molecular weight of the arylmethane isocyanates is usually about twice that of the reactive aromatic compound and therefore the arylmethane isocyanate is much higher boiling. Recovery of excess reactive aromatic compound can usually be accomplished by distilling at pressures ranging from about 1–20 mm. Hg. Distillation of the arylmethane isocyanate generally must be performed at pressure of less than 1 mm. Hg, with pressures in the range of 0.05–0.1 mm. Hg being preferred. For certain uses, such as the preparation of rigid polyurethane foams, distillation of the arylmethane isocyanate may not be required and the crude isocyanate containing ferric chloride and by-product tars may be used directly after removal of excess reactive aromatic compound.

The arylmethane isocyanates produced by the present invention are colorless, visuous liquids or solids. They are cpaable of undergoing all of the usual reactions exhibited by aromatic mono-, di- and polyisocyanates. Because of their extremely high boiling points, the arylmethane isocyanates exhibit low vapor pressures at normal temperatures and can be safely handled without special ventilation which is often required with more voaltile isocyanates.

The arylmethane monoisocyanates may be employed in any of the usual applications for aromatic monoisocyanates such as treating wool and cellulose fibers to modify their properties, treating paper or latex impregnated paper to increase wet strength, capping oxymethylene polymers, removing active hydrogen impurities from petroleum products, and assisting in bonding a variety of plastic or elastic materials to fibers containing reactive hydrogen.

The arylmethane diisocyanates which may be produced by the process of this invention are useful for preparing polyurethane elastomers and plastics and polyurethane flexible and rigid foams. The arylmethane diisocyanate prepared from 3,5,α-trichlorotoluene-2,4-diisocyanate and naphthalene when reacted with a polyalkylene ether glycol, such as polypropylene ether glycol or polytetramethylene ether glycol of about 1000–2000 molecular weight, yields elastomers which are particularly useful in the preparation of rigid urethane foams and as previously mentioned they are convenient to use without ventilation because of their exceptionally low vapor pressures. As indicated above, it is not necessary to refine the arylmethane diisocyanates when they are to be used as intermediates for the preparation of rigid urethane foams.

The arylmethane polyisocyanates find use in the preparation of a variety of adhesives and may also be used as cross-linking agents in preparing urethane elastomers and urethane foams.

The following examples, in which parts and percents are by weight unless otherwise noted, are illustrative of the process of the present invention for preparing arylmethane isocyanates:

Example 1

In an agitated vessel is placed 164 parts of phenyl isocyanate (1.38 moles), 50 parts of benzyl chloride (0.39 mole), and 1.6 parts of anhydrous ferric chloride. The mixture is heated to 156° C. at which temperature evolution of hydrogen chloride commences. The mixture is held at about 170° C. for 16 hours and then distilled without fractionation at a pressure of about 1 mm. Hg to separate volatile materials from tars. About 20 parts of non-volatile tars result from this distillation. Volatile materials are then fractionally distilled at reduced pressure. About 125 parts of low boiling material which is mainly unreacted phenyl isocyanate is collected at 42–55° C. at 10 mm. Hg pressure. An intermediate distillation cut of about 3.5 parts is taken over a boiling range of about 100–151° C. and then 21 parts of product boiling from about 151–170° C. at 10 mm. is collected. The product, 4-isocyanatodiphenylmethane, is a nearly colorless liquid.

*Analysis.*—Calculated for $C_{14}H_{11}NO$: NCO, 20.1. Found: NCO, 20.0.

Example 2

Into an agitated reaction vessel is charged 243 parts of 5,α-dichloro-2,4-tolylene diisocyanate (1.0 mole), 500 parts of naphthalene (3.9 moles) and 7.5 parts of anhydrous ferric chloride. The reaction mass is heated to 50° C. at which point evolution of hydrogen chloride begins. The temperature of the reaction mass is further increased to 120° C. when evolution of hydrogen chloride becomes vigorous. Reaction is continued at 200° C. until the evolution of hydrogen chloride nearly ceases. This requires about 2 hours. The reaction mixture is then freed of unreacted naphthalene by distilling without fractionation at reduced pressure. The high boiling material containing the product is finally heated to 240° C. at 0.5 mm. Hg to remove low-boilers and transferred to a molecular still. About 150 parts of material is distilled at temperatures ranging from 135–190° C. at 0.008–0.014 mm. Hg. The product, a mixture of (5-chloro-2,4-diisocyanatophenyl)naphthylmethane, is a very viscous amber liquid.

*Analysis.*—Calculated for $C_{19}H_{11}N_2ClO_2$: C, 68.16; H, 3.31; N, 8.37; Cl, 10.59. Found: C, 68.05; H, 3.65; N, 8.15; Cl, 11.0.

Example 3

Into an agitated reaction vessel is charged about 237 parts α-chloro-4-tolyl isocyanate (1.41 moles) and 372 parts of o-tolyl isocyanate (2.79 moles). The mixture is heated to about 45° C. and 5 parts of anhydrous ferric chloride is added. Following the addition of ferric chloride, the temperature rises to 96° C. without further addition of heat. The reaction is completed by raising the temperature to about 200° C. for 4 hours after which time the evolution of hydrogen chloride essentially ceases. The reaction mass is then distilled at reduced pressure without fractionation to separate unreacted starting materials and the crude product from reaction tars. The high-boiling fraction containing the product amounts to 224 parts of material. This fraction is redistilled in a spinning band column at a head pressure of 1 mm. Hg. The product cut distills at about 190° C. and amounts to 220 parts of material. The product, 3-methyl-4,4'-diisocyanatodiphenylmethane, is a viscous, light amber liquid.

*Analysis.*—Calculated for $C_{16}H_{12}N_2O_2$: C, 72.72; H, 4.58; N, 10.6; NCO, 31.8. Found: C, 73.25; H, 4.5; N, 10.45; NCO, 3.18.

Example 4

In a vessel equipped with agitation are placed 896 parts of 3,5,6,α-tetrachloro-2,4-tolylene diisocyanate (2.87 moles) and 2058 parts of naphthalene (16 moles). The materials are heated to about 90° C. so as to form a melt and the agitation is started. About 9 parts of anhydrous ferric chloride is added at 90° C. and the temperature is raised from 90–120° C. over an hour. The temperature is then raised rapidly to about 160° C. where it is held for 4 hours and finally raised to 210° C. where the reaction is completed in about 2 hours as evidenced by the cessation of hydrogen chloride evolution. The reaction mass is cooled and distilled without fractionation at reduced pressure. Unreacted naphthalene is distilled at about 10 mm. Hg pressure and the pressure is then reduced to about 0.1 mm. Hg and an intermediate cut is taken prior to the product which boils at about 210–220° C. at 0.1 mm. Hg. The product cut is redistilled at 0.1 mm. to remove traces of low boilers. After redistillation it amounts to 700 parts and is a very viscous, nearly colorless liquid. The product is (3,5,6-trichloro-2,4-diisocyanatophenyl)naphthylmethane in which 1-nephthyl and 2-naphthyl isomers are present.

*Analysis.*—Calculated for $C_{19}H_9N_2O_2Cl_3$: C, 56.53; H, 2.25; N, 6.94; Cl, 26.35; NCO, 20.82. Found: C, 56.6; H, 2.45; N, 6.91; Cl, 26.2; NCO, 19.65.

*Example 5*

To a vessel equipped with an agitator and water-cooled reflux condenser is added 320 parts of 1-naphthyl isocyanate (1.89 moles) and 320 parts of α-chloro-4-tolyl isocyanate (1.91 moles). The mixture is heated to 50° C., agitation is started, and 5.5 parts of ferric chloride is added. Over a period of 2 hours the temperature is raised at an even rate to 210° C. The reaction mass is held at 210° C. for about 4 hours after which the evolution of hydrogen chloride essentially ceases. The reaction mass is cooled and distilled without fractionation at reduced pressure. After removing low boilers, the crude product distills at about 200° C. at 0.1 mm. Hg. The product cut is redistilled to remove traces of tar entrained in the first distillation. The product cut, after redistillation, amounts to about 308 parts of colorless liquid which crystallizes on standing at room temperature. After recrystallizing twice from hexane this material (4-isocyanatophenyl) (4-isocyanato-1-naphthyl)methane, has a melting point of 86.0–86.5° C.

*Analysis.*—Calculated for $C_{19}H_{12}N_2O_2$: C, 75.98; H, 4.03; N, 9.33; NCO, 27.98. Found: C, 75.95; H, 4.10; N, 9.18; NCO, 28.05.

*Example 6*

Into a reaction vessel equipped with an agitator and water-cooled condenser is placed about 243 parts of 5,α-dichloro-2,4-tolylene diisocyanate (0.1 mole) and 696 parts (4.0 mole) of a mixture having a composition of 80 parts 2,4-tolylene diisocyanate and 20 parts 2,6-tolylene diisocyanate. The materials in the reaction vessel are heated to 50° C., agitation is started and 9.4 parts of anhydrous ferric chloride is added. The temperature of the mixture is raised at an even rate to about 200° C. over a period of 2 hours and then maintained at about 200° C. for about 4 hours. The reaction mixture is cooled and distilled at reduced pressure. Excess tolylene diisocyanate is removed at about 120° C. at 10 mm. Hg pressure and the product is distilled at about 200–210° C. and 0.1 mm. Hg away from non-volatile residues. The product, a mixture predominately 5-chloro-5'-methyl-2,2',4,4'-tetraisocyanatodiphenylmethane containing a minor proportion of 5-chloro-3'-methyl-2,2',4,4'-tetraisocyanatodiphenylmethane, is a solid. After recrystalliation from benzene, it has a melting point of 153–159° C.

*Analysis.*—Calculated for $C_{18}H_9N_4O_4Cl$: C, 56.78; H, 2.38; N, 14.72; Cl, 9.31; NCO, 44.1. Found: C, 56.85; H, 2.45; N, 14.55; Cl, 9.40; NCO, 43.2.

PURIFICATION OF ALKYLARYL ISOCYANATES CONTAMINATED WITH HALOALKYLARYL ISOCYANATES

The purification process can be used to remove a wide variety of haloalkylaryl isocyanate contaminants from alkylaryl isocyanates. Representative examples of haloalkylaryl isocyanates include those isocyanates listed previously as representative examples of halomethylaryl compounds for preparing arylmethane isocyanates and also such compounds as α-chloro-2,6-tolylene diisocyanate, α-chloro-4,4'-diisocyanatodiphenylmethane, 5,α-dibromo-2,4-tolylene diisocyanate, and 3,5,6,α-tetrachloro-2,4-tolylene diisocyanate. Alkylaryl diisocyanates having more than one α-halogen may also be removed. Examples of such compounds are 5,α,α-trichloro-2,4-tolylene diisocyanate, 3,5-α,α-tetrachloro-2,6-tolylene diisocyanate and 3,5,α,α-tetrabromo-2,4-tolylene diisocyanate. As indicated by the representative isocyanates listed above, the purification is limited to the removal of α-haloalkyl isocyanates in which the halogen is chlorine or bromine.

Typical alkylaryl isocyanates which may be purified include such compounds as 2-tolyl isocyanate, 4-tolyl isocyanate, 4-ethylphenyl isocyanate, tolylene diisocyanates, xylene diisocyanates, ring-halogenated tolylene diisocyanates, 4,4'-diisocyanatodiphenylmethane and toluene-2,4,6-triisocyanate. The process is especially effective with either 2,4-tolylene diisocyanate or 2,6-tolylene diisocyanate and mixtures of the two isomers. As previously indicated, the purification is of particular use with ring-halogenated tolylene diisocyanates such as 5-chloro-2,4-tolylene diisocyanate, 3,5-dichloro-2,4-tolylene diisocyanate, 5-bromo-2,4-tolylene diisocyanate, 3-chloro-2,6-tolylene diisocyanate, and 3,4,5-trichloro-2,6-tolylene diisocyanate.

Removal of haloalkylaryl isocyanates by the purification process of the present invention involves condensation with an aromatic compound which is reactive, i.e. alkylated, in a Friedel-Crafts alkylation type reaction. The condensation products formed by this reaction have molecular weights which are about double those of the desired alkylaryl isocyanate and as a result, they have boiling points that are far above the boiling point of the desired isocyanate. Furthermore, if any of the condensation product is entrained or co-distilled with the desired isocyanate, it no longer has the highly reactive α-halogen which causes many undesirable side reactions. Because non-α-halogen containing alkylaryl isocyanates with unsubstituted positions, particularly para to an isocyanato group, on the benzene ring are capable of undergoing the Friedel-Crafts condensation, the reactive aromatic compounds selected to react with the α-haloalkylaryl isocyanate are ones which are known for the ease, i.e., with respect to the desired isocyanate as described previously, with which they can be alkylated by the Friedel-Crafts reaction. The reactive aromatic compounds listed in the previous section on "Preparation" are also suitable for the purification process. Anisole, phenetole, naphthalene, and anthracene are the preferred reactive aromatic compounds for purifying alkylaryl isocyanates.

The quantity of reactive aromatic compound which should be employed in the present process depends to a certain extent on the concentration of haloalkylaryl isocyanate impurity which is present. Since the preferred reactive aromatic compounds can condense with more than one α-halogen equivalent of haloalkylaryl isocyanate, i.e., more than one alkylaryl isocyanate substituent can be introduced into the aromatic ring of the reactive aromatic compound, less than one mole of reactive aromatic compound may be used per mole of α-halogen present. Owing to the bulky nature of the substituents involved, it is doubtful that more than three moles of haloalkylaryl isocyanate can react with 1 mole of reactive aromatic compound. As the size of a molecule of the haloalkylaryl isocyanate being reacted increases, the possibility for multi-substitutions into the ring of the reactive aromatic compound decreases. Because of the uncertainty of how many haloalkylaryl isocyanate molecules will actually substitue into a molecule of reactive aromatic compound and further, because of the small concentration of both reactants in the alkylaryl isocyanate being purified, it is preferred to use a known excess of the reactive aromatic compound so that removal of the α-halogen impurities is more complete and the loss of the desired alkylaryl isocyanate is minimized. In terms of the formulas

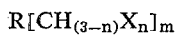

and R'H previously defined, at least $mn$ moles of reactive aromatic compound is preferred. Essentially complete removal of α-haloalkylaryl isocyanates is obtained with practical times and conditons when the reactive aromatic compound is used in a quantity of about 1.5–3.0 moles per equivalent of α-halogen contaminant. Since it is preferred to use the reactive aromatic compound in excess, selection of the aromatic compound for the purification of a given alkylaryl isocyanate should take into consideration the need for separation of the excess aromatic compound from the desired alkylaryl isocyanate by distillation. For this reason, the reactive aromatic compound should be chosen so that it has a boiling point well above or below that of the alkylaryl isocyanate which is being purified. Reactive aromatic compounds which boil far above the desired isocyanate are particularly easy to use and offer the additional advantage of remaining in the still heels after distillation of the purified isocyanate where they may serve to thin or plasticize the still residue. Polyphenylene ethers may be used as the reactive aromatic compound when a low-boiling material might be undesirable.

If the quantity of reactive aromatic compound employed is not sufficient for the haloalkylaryl isocyanate to condense with it readily, then removal of the haloalkylaryl contaminant will be incomplete, or if the reaction is speed-up sufficiently by increasing temperature, the haloalkylaryl isocyanates may be removed by reaction with the desired alkylaryl isocyanate when it is reactive; i.e., when it has an open ring position, especially one para to an isocyanato group. While it is generally preferable to make use of highly active aromatic non-isocyanate compounds such as anisole and naphthalene, it may be convenient when the quantity of haloalkylaryl isocyanate impurity is very small to make use of the desired alkylaryl isocyanate as the reactive aromatic compound when it has an unsubstituted position para to an isocyanato group. The minor proportion of haloalkylaryl isocyanate reacts with a corresponding amount of alkylaryl isocyanate to form a condensation product having a substantially higher boiling temperature than that of the alkylaryl isocyanate, thus enabling the lower boiling alkylaryl isocyanate to be separated therefrom by distillation. Naturally this results in a small yield loss of isocyanate, but it simplifies the procedure and eliminates any possible contamination of the desired isocyanate by an extraneous reactive aromatic compound.

In carrying out the process of the present invention, it is often desirable to know the approximate concentration of haloalkylaryl isocyanate contaminants present in the alkylated aromatic isocyanate to be purified. Likewise, analysis for haloalkyl impurities in isocyanates purified by the present process is of value in order to guarantee that the purification has been carried out properly. The following procedure has been found useful for making these determinations:

About 2.5 grams to 3.0 grams of sample is weighed into a 250 milliliter round bottom flask. About 30 milliliters of 10% aqueous KOH and 30 milliliters of tetrahydrofuran are added and the mixture is refluxed for 2 hours. The mixture is cooled and acidified with 1:1 nitric acid and 2-3 milliliters excess acid is added. Halogen ion is determined on the entire sample of a suitable aliquot by potentiometric titration. In view of the high reactivity of the haloalkylaryl isocyanates, which has already been mentioned, the reaction with the potassium hydroxide-water-tetrahydrofuran reagent is not surprising. The values obtained by this method will usually be slightly on the high side because of the presence of other materials which may yield chlorine ions. Ring-halogenated aryl isocyanates, however, do not react. Isocyanates samples suspected of containing large quantities of carbamyl chloride as well as haloalkylaryl isocyanates should be sparged well with a dry inert gas at temperatures of about 150–200° C. and preferably distilled before applying this method for the estimation of haloalkyl aromatic isocyanate content.

In some cases, estimation of haloalkyl aromatic isocyanate content may be made by using the ASTM method recommended for assaying toluene diisocyanate (ASTM D1638–60T). This method is based on reacting the isocyanate with an excess of dibutylamine and backtitrating with a standard solution of hydrochloric acid to determine unreacted dibutylamine. The dibutylamine consumed by the isocyanate is equivalent to the isocyanato group content of the sample. When this assay procedure is applied to isocyanates containing haloalkyl aromatic isocyanate contaminants, the haloalkyl compounds present react with the dibutylamine to form a tertiary amine hydrochloride. Therefore, assay in this case measures the total of isocyanato groups plus haloalkyl groups. This method is limited in its usefulness, because considerable knowledge as to the composition of the mixture being analyzed must be available if the results obtained are to be meaningful. It is of use however with mixtures such as 5,α-dichloro-2,4-tolylene diisocyanate in 3,5-dichloro-2,4-tolylene diisocyanate where the content of haloalkyl isocyanate is reflected by apparent isocyanato contents greater than those calculated for pure ring dichlorinated tolylene diisocyanate.

As mentioned in the section concerning preparation of arylmethane isocyanates, any conventional metal halide Friedel-Crafts type catalyst can be used to bring about the condensation reaction of the haloalkylaryl isocyanate and the reactive aromatic compound, but ferric chloride is preferred because it is soluble in isocyanates and can bring about condensation of the haloalkylaryl isocyanate with the reactive aromatic compound in a reasonable length of time. Furthermore, it does not have to be removed or deactivated prior to the separation of the desired alkylated aromatic isocyanate from high boilers by distillation. As little as 0.1% catalyst is capable of bringing about the condensation of the haloalkylaryl isocyanate and the reactive aromatic compound. However, such small quantities of catalysts prolong the time required for the condensation to take place with an attendant increase in the formation of by-products and it is therefore generally preferred to use about 0.5 to 2.0 parts of the Friedel-Crafts catalyst per 100 parts of crude isocyanate. This proportion is quite high in comparison with the proportion of haloalkylaryl isocyanate contaminant present, but is considered necessary to have all of the α-halogen compound condense. Obviously, greater quantities of catalyst can be used, but excessive amounts of catalyst will generally lead to distillation losses of the desired alkylaryl isocyanate by increasing the size of the still heel. In the case of ring halogenated isocyanates which have been made by halogenation of the corresponding alkylaryl isocyanate in the presence of ferric chloride, removal of the haloalkylaryl isocyanate contaminants can be accomplished in the presence of the ferric chloride which was employed to run the halogenation. In this case, the quantity of the ferric chloride present may often exceed the quantity of catalyst required to run this novel purification process, but the additional catalyst causes no undesirable side reactions and only results in a distillation loss which must be suffered at some time.

The novel purification process can be carried out at temperatures ranging from about 50–250° C. depending upon such factors as the quantity of the catalyst used and the boiling point or freezing point of the system. In general, temperatures ranging from 180° C. to 220° C. are preferred when ferric chloride is used as the catalyst in the recommended range of 0.5–2.0 parts per 100 parts of isocyanate. Temperatures above 250° C. are generally not employed because the rate of thermal decomposition of the desired diisocyanate may become excessive at such high temperatures. Naturally, the temperature of the treatment cannot exceed the boiling point of the system without adding the complication of pressurizing the system. It is also obvious that treatment can only be performed satisfactorily above the melting point of the system involved.

The nature of the reactive aromatic compound which is added to condense with the haloalkylaryl isocyanate impurity also determines to some extent the temperatures which can be employed in carrying out the purification process of this invention. For example, with highly reactive aromatic compounds such as anisole and naphthalene, the reaction can be performed at lower temperatures than those which are required when an alkylated aromatic isocyanate of lower reactivity, such as 3-chloro-2,6-tolylene diisocyanate, is itself employed as the reactive aromatic compound.

The time required to complete the condensation reactions which are involved in the process of this invention also depends on several factors. With the preferred ferric chloride catalyst employed in recommended quantities, the reaction can be completed at temperatures of about 200° C. in a period of 1 to 6 hours when anisole or naphthalene is used as the reactive aromatic compound. If the desired alkylated aromatic isocyanate serves as the reactive aromatic compound, the time required to complete the reaction may range from 2–40 hours at a reaction temperature of about 200° C. At lower temperatures, the time required to complete the reaction increases in the manner which would be expected. If large quantities of catalyst are employed at elevated temperatures approaching 250° C., the purification reaction can be completed in a relatively short time.

The Friedel-Crafts condensation may be carried out in the presence of a solvent if it is so desired. However, the solvent used must not be attacked by the Friedel-Crafts catalyst and should have a boiling point sufficiently high to permit the condensation reaction of the haloalkylaryl isocyanate with the reactive aromatic compound to be completed in a reasonable length of time. Solvents such as o-dichlorobenzene, trichlorobenzene and nitrobenzene may be employed. On occasion it may be convenient to select a solvent which can serve as the reactive aromatic compound. Thus, anisole can be used as a solvent and in this case removal of haloalkylaryl isocyanate impurities is exceptionally complete and takes place rapidly as would be expected. It is obvious however, that when solvents are employed, isolation of the desired alkylated aromatic isocyanate may be complicated by the need for separation from the solvent.

The condensation of haloalkylaryl isocyanates with reactive aromatic compounds is accompanied by the production of hydrogen chloride. If the condensation is carried out at temperatures below 100–150° C., this hydrogen chloride will combine with isocyanato groups to yield carbamyl chlorides. The carbamyl chlorides may in turn react via a Friedel-Crafts acid chloride type condensation with the desired alkylaryl isocyanate, if the latter has an open position on the aromatic ring. This undesirable side-reaction can be minimized by sparging the condensation mass with a dry inert gas during the reaction period and/or employing a packed tower or other thin film reactor to allow rapid outward diffusion of HCl. Sparging of the condensation mass with a slow stream of inert gas is still recommended at high temperatures so that hydrogen chloride will be removed about as rapidly as it is evolved. It should be pointed out that crude isocyanates may often contain large amounts of hydrogen chloride in the form of carbamyl chlorides. Before such a crude isocyanate is purified by the process of this invention, it should be heated to a temperature in the range of 150–200° C. and sparged with an inert gas to remove most of the hydrogen chloride in order to avoid the side-reaction discussed above.

The purification process may be carried out in a variety of conventional laboratory and plant scale equipment. Any vessel which may be heated to the desired temperature and which can be agitated either mechanically or even by means of inert gas sparging can be employed. As indicated above, packed towers or other thin-film reactors may also be employed to advantage and are convenient for carrying out the purification continuously. If batch distillation equipment is to be employed in separating the desired alkylaryl isocyanate from unreacted active aromatic compound and high boiling materials, the condensation reaction can be carried out in the still pot prior to distillation. While the ingredients required can be charged in any order, it is generally preferred to add the impure isocyanate to the reaction vessel followed by the reactive aromatic compound and the Friedel-Crafts catalyst. The reactive aromatic compound and catalyst can be added at any temperature up to the proposed reaction temperature, but it is generally desirable to make these additions at lower temperatures because the condensation reaction generates heat. If the quantity of α-haloalkylaryl isocyanate is relatively large, an appreciable heat kick my be observed when the Friedel-Crafts catalyst is introduced. This heat kick will also be accompanied by vigorous evolution of hydrogen chloride. Care should be taken to insure that the reactive aromatic compound and the Friedel-Crafts catalyst have been dissolved and uniformly mixed throughout the alkylaryl isocyanate to be purified. As previously indicated, this may be done with mechanical agitation or even by sparging with an inert gas. If the system is operated at reflux, the agitation produced by vigorous boiling may be sufficient to mix all reactants properly.

When the condensation reaction of the haloalkylaryl isocyanate and the reactive aromatic compound is complete, excess reactive aromatic compound and the desired alkylaryl isocyanate are recovered by distilling away from the high molecular weight condensation products, by-product tars, and the Friedel-Crafts catalyst. While some monoisocyanates can be distilled successfully at atmospheric pressure, vacuum distillation is preferred because of the relatively high boiling points which are exhibited by alkylaryl isocyanates in general. Distillation may be performed in conventional batch or continuous vacuum distillation equipment. While a limited degree of fractionation is often desirable, simple distillation is usually adequate if the reactive aromatic compound has been selected so that its boiling point differs sufficiently from the boiling point of the desired alkylaryl isocyanate. If a reactive aromatic compound boiling below the desired isocyanate has been used in the Friedel-Crafts condensation, it will generally be desirable to take an intermediate cut or fraction between the cuts representing recovered aromatic compound and the alkylaryl isocyanate. In distilling the desired isocyanate away from non-volatile residues, care should be taken to keep from drying up the residues as a result of overheating. This is particularly true when continuous distillation equipment is being employed. In general, material in the still should not be heated above 200° C. If the residues remaining after distillation cannot be removed from the still by draining, they can usually be thinned by means of solvents such as o-dichlorobenzene, trichlorobenzene and acetone. If the residues from distillation have been baked solid by overheating, removal by mechanical means may be required.

The following examples, in which parts and percents are by weight unless otherwise noted, are illustrative of the process for purifying alkylaryl isocyanates contaminated with haloalkylaryl isocyanates:

*Example 7*

In a heated reaction vessel, equipped with a nitrogen inlet located near the bottom of the vessel and a reflux condenser, is placed 950 parts of ring dichlorinated tolylene diisocyanate containing approximately 15% by weight of 5,α-dichlorotolylene diisocyanate. About 120 parts of anisole is added (about 1.9 moles per mole of α-halogen) and the mixture is heated to 145° C. The mixture is sparged with nitrogen by introducing a small flow of gas through the nitrogen inlet and about 2.5 parts of anhydrous ferric chloride is added. Following the addition of ferric chloride, the system evolves hydrogen chloride vigorously. Once the vigorous evolution of hydrogen chloride has ceased, the mixture is heated to about 200° C. for 14 hours, during which time a small nitrogen flow through the reaction mass is maintained. At the end of the heating period, the reaction mixture is cooled and distilled under vacuum. About 54 parts of unreacted anisole are recovered at about 64° C. at 30 mm. Hg pressure and an intermediate cut amounting to about 11 parts of material is taken over a temperature range of 64–166° C. at 10 mm. Hg pressure. Following the intermediate cut, 733 parts of purified ring dichlorinated tolylene diisocyanate is collected over a boiling range of 166 to 172° C. at 10 mm. Hg pressure. Following the main cut, a fraction amounting to 25 parts of material is taken at a boiling range of 172 to 176° C. as the end of the distillation is approached. A high boiling residue amounting to 208 parts of material remains in the still pot at the end of the distillation.

The purified ring dichlorinated tolylene diisocyanate is assayed for percent isocyanato groups. The usual method of reacting the isocyanate with an excess of dibutylamine and backtitrating the unreacted dibutylamine with dilute standard hydrochloric acid solution is employed. The purified diisocyanate contains 34.7% isocyanato group as compared to the calculated value of 34.5% for dichlorotolylene diisocyanate. The "isocyanato" value by analysis of the impure dichlorotolylene diisocyanate employed as a starting material in this example is about 37.0%. The high value obtained with the starting material is caused by the $\alpha$-halogen of the 5,$\alpha$-dichlorotolylene diisocyanate reacting with dibutylamine to produce a tertiary amine and hydrogen chloride and serves as an indication of the $\alpha$-halogen content of the starting material.

*Example 8*

In a heated reaction vessel equipped with a reflux condenser and a nitrogen inlet near the bottom of the vessel, is placed 3000 parts of 3,5,6-trichloro-2,4-tolylene diisocyanate contaminated with about 5 wt. percent 3,5,$\alpha$-trichloro-2,4-tolylene diisocyanate, 300 parts of naphthalene and 30 parts of anhydrous ferric chloride. This corresponds to a mole ratio of 4.3/1 of naphthalene to $\alpha$-halogen. The naphthalene and ferric chloride are added to the trichlorotolylene diisocyanate at a temperature of about 125° C. A small stream of nitrogen is sparged through the mixture which is heated to 210° C. and held at this temperature for 1 hour. Unreacted naphthalene is removed from the reaction mass by distilling under vacuum at 30 mm. Hg pressure. Purified 3,5,6-trichloro-2,4-tolylene diisocyanate is then removed by distillation under vacuum at a pressure of about 5mm. Hg. Distillation of the purified trichlorotolylene diisocyanate is continued until the temperature in the still pot reaches about 200° C. The distilled product is essentially colorless and analysis for percent isocyanato group gives a value of 30.25% as compared to a theoretical value of 30.28%.

*Example 9*

Crude dichlorotolylene diisocyanate is prepared by halogenating a mixture of about 80 parts 2,4-tolylene diisocyanate and 20 parts of 2,6-tolylene diisocyanate employing the following procedure. Chlorine is introduced about as rapidly as it is consumed into the well-agitated tolylene diisocyanate isomer mixture in the presence of about 2% of ferric chloride. In order to prevent excessive losses of unreacted chlorine, a "Dry Ice" reflux condenser is attached to the chlorination vessel so that evolved hydrogen chloride gas escapes while most of the chlorine is condensed and returned to the reaction. About 2.4 moles of chlorine gas are supplied for each mole of tolylene diisocyanate present in the reaction vessel. Chlorination is conducted in the temperature range of 80–90° C. Following the addition of chlorine, the chlorination mass is heated to about 140° C. and nitrogen is sparged through the mixture for about 1 hour to remove hydrogen chloride gas. The mixture is then cooled to 100° C. and 10 parts of anisole is added for each 100 parts of crude dichlorotolylene diisocyanate. No additional ferric chloride is added. Following the addition of anisole, the mixture is heated as rapidly as possible to 200° C. and held at that temperature until HCl evolution ceases (about 6 hours). The treated mass of crude dichlorotolylene diisocyanate is then transferred to batch distillation equipment. Unreacted anisole is removed at a pressure of about 30 mm. Hg and then dichlorinated tolylene diisocyanate is distilled away from tars and ferric chloride at a pressure of about 10 mm Hg. The purified 3,5-dichloro-2,4-tolylene diisocyanate contains some 5-chloro-2,4-tolylene diisocyanate and some 3,5,6-trichloro-2,4-tolylene diisocyanate but is essentially free of $\alpha$-chlorotolylene diisocyanate impurities. This is indicated by determining the amount of $\alpha$-halogen by the procedure described earlier in the specification. The material contains 0.003% chlorine by this procedure which corresponds to a maximum of 0.025% 5,$\alpha$-dichloro-2,4-tolylene diisocyanate. After storage for several weeks, this material is still essentially colorless and a polyurethane polymer produced by reacting the purified material with about an equivalent amount of polytetramethylene ether glycol of 1000 molecular weight is essentially colorless.

*Example 10*

Distilled 2,4-tolylene diisocyanate (resulting from the phosgenation of 2,4-tolylene diamine using phosgene contaminated with chlorine) containing $\alpha$-chloro-2,4-tolylene diisocyanate as indicated by poor color stability and an $\alpha$-chlorine content of about 0.10% by the analysis given previously in the specification, is treated by the instant process of the present invention employing the 2,4-tolylene diisocyanate itself as the reactive aromatic compound. About 100 parts of tolylene diisocyanate is placed in a vessel equipped with a nitrogen inlet and reflux condenser. About 0.5 part of anhydrous ferric chloride is added and the mixture is sparged with nitrogen to dissolve the ferric chloride. This mixture is then heated to about 200° C. and held at this temperature for about 8 hours, during which time the nitrogen sparge is continued. The purified 2,4-tolylene diisocyanate is removed from tars and ferric chloride by distillation under reduced pressure. The purified tolylene diisocyanate has an $\alpha$-chlorine content of about 0.004% by the analysis given in the specification and is essentially colorless after several weeks of storage. If the contaminated 2,4-tolylene diisocyanate is heated to 200° C. with a nitrogen sparge for an 8-hour period in the absence of ferric chloride and then redistilled, the $\alpha$-chlorine content is essentially unchanged and the material develops color on standing, indicating that it still contains $\alpha$-chloro-2,4-tolylene diisocyanate.

Many arylmethane isocyanates other than described in Examples 1–6 will be obtained by reacting according to the process hereinbefore set forth halomethylaryl and equivalent haloalkylaryl compounds other than employed in said examples, and similarly, substantially like results will be obtained by purification of different alkylaryl isocyanates which are contaminated by one or more haloalkylaryl isocyanates other than employed in Examples 7–10.

As many apparently widely different embodiments of this invention may be made without departing from the spirit and scope thereof, it is to be understood that this invention is not limited to the specific embodiments except as defined in the appended claims.

What is claimed is:

1. A process for preparing essentially monomeric arylmethane isocyanates, comprising contacting and reacting an $\alpha$-halogenated aromatic compound of the formula $R[CH_{(3-n)}X_n]_m$ with at least $mn$ moles of a aromatic compound of the formula R'H, at a temperature of about 50 to about 250° C. in the presence of a Friedel-Crafts catalyst, wherein X is selected from the group consisting of Cl and Br; $m$ and $n$ are independently selected from the group consisting of 1 and 2; R is selected from the group consisting of unsubstituted, except as defined above, and substituted phenyl, phenylene, naphthyl, and naphthylene; and R' is selected from the group consisting of unsubstituted and substituted naphthyl, anthryl, 4-aryloxyphenyl, 4-alkoxyphenyl, and 4-isocyanatophenyl, the substituents for R and R' being selected from the group consisting of Cl, Br, $C_1$–$C_4$ and —NCO with the provisos that the sum of the —NCO groups in R and R' must be at least one and that each —NCO group is separated from another —NCO group by at least one ring position, and obtaining as a result thereof arylmethane isocyanate.

2. The process of claim 1 wherein from 3–5 moles of aromatic compound per equivalent of α-halogen in a mole of the α-halogenated aromatic compound is employed in the contacting and reacting step.

3. The process of claim 1 wherein said α-halogenated aromatic compound and said aromatic compound are sparged during the reaction therebetween with a dry inert gas.

4. The process of claim 1 wherein said aromatic compound and said catalyst are brought into contact with one another and then said α-halogenated aromatic compound is slowly added thereto.

5. The process of claim 1 wherein the aromatic compound is tolylene diisocyanate.

6. The process of claim 1 wherein the α-halogenated aromatic compound is a halotolylene diisocyanate.

7. The process of claim 1 wherein $n$ and $m$ are each 1.
8. The process of claim 1 wherein $n$ is 1 and $m$ is 2.
9. The process of claim 1 wherein $n$ is 2 and $m$ is 1.
10. The process of claim 1 wherein $n$ is 2 and $m$ is 2.
11. A process for purifying a mixture of alkylaryl isocyanate contaminated with haloalkylaryl isocyanate in which the α-halo substituent is selected from the group consisting of chlorine and bromine, which process comprises contacting and reacting said mixture in the presence of a Friedel-Crafts catalyst and at temperatures between 50 and 250° C., with from 1.5 to 3.0 moles of aromatic compound per equivalent of α-halogen in a mole of the haloalkylaryl isocyanate, said aromatic compound being of the formula R'H wherein R' is a radical selected from the group consisting of unsubstituted and substituted naphthyl, anthryl, 4-alkoxyphenyl, 4-aryloxyphenyl and 4-isocyanatophenyl, the substituents of R' being independently selected from the group consisting of Cl, Br, $C_1$–$C_4$ alkyl and —NCO with the proviso that each —NCO group is separated from another —NCO group by at least one aromatic ring position, and subsequently separating the alkylaryl isocyanate by distillation.

12. The process of claim 11 wherein the aromatic compound is anisole.

13. The process of claim 11 wherein the aromatic compound is naphthalene.

14. The process of claim 11 wherein an organic solvent is present in the contacting and reacting step.

15. The process of claim 11 wherein the distillation is carried out at sub-atmospheric pressure.

16. The process of claim 11 wherein the aromatic compound has a boiling temperature substantially different from that of the alkylaryl isocyanate.

17. The process of claim 11 wherein the alkylaryl isocyanate is tolylene diisocyanate.

18. The process of claim 11 wherein said mixture is sparged at temperatures between 150–200° C. with an inert gas prior to the contacting and reacting step.

References Cited by the Examiner

UNITED STATES PATENTS 3,155,699   11/1964   Powers _____ 260—453

OTHER REFERENCES

Fuson: "Advanced Organic Chemistry," page 317 (1950).

Thomas: Anhydrous Aluminum Chloride in Organic Chemistry, 1941, pp. 122–126 (pp. 124 and 125 relied on).

CHARLES B. PARKER, *Primary Examiner.*

JOSEPH P. BRUST, *Examiner.*

STANLEY H. LIEBERSTEIN, DALE R. MAHANAND, *Assistant Examiners.*